(12) United States Patent
Zhang et al.

(10) Patent No.: US 9,614,648 B2
(45) Date of Patent: Apr. 4, 2017

(54) METHOD AND APPARATUS FOR CONTROLLING ENERGY EXPANDING OF SENSOR NETWORK NODES

(75) Inventors: Daqing Zhang, Shanghai (CN); Ningjiang Chen, Shanghai (CN); Jin Wang, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 2382 days.

(21) Appl. No.: 12/298,595

(22) PCT Filed: Apr. 19, 2007

(86) PCT No.: PCT/IB2007/051418
§ 371 (c)(1),
(2), (4) Date: Oct. 27, 2008

(87) PCT Pub. No.: WO2007/125462
PCT Pub. Date: Nov. 8, 2007

(65) Prior Publication Data
US 2009/0185542 A1    Jul. 23, 2009

(30) Foreign Application Priority Data
Apr. 29, 2006    (CN) .......................... 2006 1 0077346

(51) Int. Cl.
*H04W 4/00*    (2009.01)
*H04L 1/18*    (2006.01)
(Continued)

(52) U.S. Cl.
CPC .............. *H04L 1/188* (2013.01); *G01D 3/00* (2013.01); *H04W 40/10* (2013.01);
(Continued)

(58) Field of Classification Search
CPC ......... G01D 3/00; H04L 1/0001; H04L 1/188; H04W 40/10; H04W 40/246;
(Continued)

(56) References Cited

U.S. PATENT DOCUMENTS 5,974,327 A * 10/1999 Agrawal et al. ........... 455/452.2
H1880 H * 10/2000 Vines et al. .................. 370/310
(Continued)

FOREIGN PATENT DOCUMENTS

JP        8009462 A    1/1996

OTHER PUBLICATIONS

An Energy-Efficient TCP Quick Timeout Scheme for Wireless LANs, Ci et Al. 2003.*
(Continued)

*Primary Examiner* — Chi H Pham
*Assistant Examiner* — Robert Lopata

(57) ABSTRACT

A method and apparatus for controlling energy expended by sensor network nodes is disclosed. The method comprises steps of acquiring energy information that is indicative of an energy status of a node in the network and adjusting at least one data transmission parameter according to the energy information. In a wireless network where the communication capacity and power energy of sensor nodes are limited, the invention provides the capability of efficiently utilizing the network resources, conserving power consumption of sensor nodes, and prolonging the life of the sensor network.

12 Claims, 5 Drawing Sheets

(51) Int. Cl.
    *G01D 3/00* (2006.01)
    *H04W 40/10* (2009.01)
    *H04W 40/24* (2009.01)
    *H04W 52/02* (2009.01)
    *H04L 1/00* (2006.01)
    *H04W 84/18* (2009.01)

(52) U.S. Cl.
    CPC ..... *H04W 40/246* (2013.01); *H04W 52/0261* (2013.01); *H04L 1/0001* (2013.01); *H04W 84/18* (2013.01); *Y02B 60/50* (2013.01)

(58) Field of Classification Search
    CPC .. H04W 52/0261; H04W 84/18; Y02B 60/50; H04B 1/0053; H04B 1/006; H04B 1/50; H04B 1/52
    USPC ....... 370/229, 230, 310, 311, 328, 335, 338; 455/403, 452.1
    See application file for complete search history.

(56) References Cited

U.S. PATENT DOCUMENTS

| | | | |
|---|---|---|---|
| 6,747,993 B2 | 6/2004 | Rinchiuso | |
| 6,760,303 B1* | 7/2004 | Brouwer | 370/229 |
| 6,954,651 B2* | 10/2005 | Yamato | 455/509 |
| 7,027,843 B2* | 4/2006 | Cromer et al. | 455/574 |
| 7,227,847 B2* | 6/2007 | Gluck | 370/311 |
| 7,356,014 B2* | 4/2008 | Park et al. | 370/338 |
| 7,636,132 B2* | 12/2009 | Sakamoto | 348/723 |
| 7,764,965 B2* | 7/2010 | Bartlett | 455/436 |
| 2001/0002910 A1 | 6/2001 | Kikuchi | |
| 2003/0012222 A1* | 1/2003 | Rinchiuso | 370/468 |
| 2004/0165543 A1* | 8/2004 | Nakazawa | 370/252 |
| 2006/0268787 A1* | 11/2006 | Strutt et al. | 370/335 |
| 2008/0112348 A1* | 5/2008 | Park et al. | 370/311 |
| 2008/0119215 A1* | 5/2008 | Ji et al. | 455/522 |
| 2008/0268917 A1* | 10/2008 | Chang et al. | 455/574 |
| 2011/0032821 A1* | 2/2011 | Morrill et al. | 370/230 |

OTHER PUBLICATIONS

On Time-out Driven Power Management Policies in Wireless Networks, Zheng et Al. 2004.*
On the Energy Impact of Four Information Delivery Methods in Wireless Sensor Networks, Taddia et Al. 2005.*
A Dynamic Adaptive Acknowledgment Strategy for TCP over Multihop Wireless Networks, Oliveria et Al. 2005.*
A SIP Signaling Retransmission Scheme for Efficient Mobile IPTV Service over 3G Wireless Networks, Lee et Al. 2006.*
An adaptive energy efficient MAC protocol for wireless sensor networks, Zhong et Al. 2003.*
Reducing Power Consumption by Utilizing Retransmission in Short Range Wireless Network, Zhao et Al. 2002.*

* cited by examiner

METHOD AND APPARATUS FOR CONTROLLING ENERGY EXPANDING OF SENSOR NETWORK NODES

This invention is related to a wireless sensor network, in particular, to a method and apparatus for controlling energy expended by wireless sensor network nodes.

There are some limitations to sensor networks. Firstly, the communication capacity of sensor networks is very limited; the communication bandwidth of sensors in sensor networks is narrow and often varied, and the coverage range of communication is only several tens of meters to hundreds of meters. If the data transmission exceeds the available bandwidth, a high lost-packet rate will be caused.

Secondly, the power energy of sensors is very limited. A lot of energy is required in the information sensing of a sensor network, data process and communication. If the node power supply of a sensor network includes batteries that cannot be replaced, the energy consumption from the batteries will directly affect the life of the sensor network.

Cluster head data fusion is a means of reducing node energy consumption by reducing network traffic. In such a means, the sensor network usually includes a plurality of node clusters, and each node cluster includes a central node, and a sensor network is divided into a plurality of sensor sub networks, so it can avoid a data communication bottleneck of transferring original data directly from each sensor node to a sensor network base station.

Furthermore, the operation mode based on wake-up when required between a coverage node (i.e. a cluster head node) and a sensor node in a Zigbee network can also partly solve the problem of energy supply in the sensor network.

However, a plurality of sensor nodes is included in the sensor network, and the data process and communication status of the sensor nodes are different from each other, and the corresponding energy consumption statuses of the nodes are different from each other. Therefore, on the premise that the communication capacity and power energy of sensor nodes are limited in a wireless sensor network, the problems of how to efficiently utilize the network resource to conserve the power consumption of sensor nodes and prolong the life of the sensor network still need to be solved.

The present invention provides a method and apparatus for controlling energy expended by sensor network nodes, which are capable of efficiently utilizing the network resource to conserve the power consumption of sensor nodes, and prolong the life of the sensor network.

An exemplary method for controlling energy expended by a network in accordance with the present invention comprises the steps of: acquiring energy information, said energy information being indicative of an energy status of a node in the network; and adjusting at least one data transmission parameter according to the energy information.

An exemplary apparatus for controlling energy expended by a network in accordance with the present invention comprises: an acquiring device for acquiring energy information, said energy information being indicative of an energy status of a node in the network; and an adjusting device for adjusting at least one data transmission parameter according to the energy information.

An exemplary computer program product for controlling energy expended by a network in accordance with the present invention comprises: code for acquiring energy information, said energy information being indicative of the energy status of a node in the network; and code for adjusting at least one data transmission parameter according to the energy information.

An exemplary network in accordance with the present invention comprises: a plurality of nodes and a network controller connected with said plurality of nodes; said network controller comprising an acquiring device for acquiring energy information, said energy information being indicative of an energy status of a node in the network, and an adjusting device for adjusting at least one data transmission parameter according to the energy information.

In summary, on the premise that the communication capacity and power energy of sensor nodes are limited in a wireless sensor network, the present invention can adjust a data transmission parameter of the nodes according to energy information of the nodes, conserve the power consumption of sensor nodes, and prolong the life of the sensor network, in order to more efficiently utilize the network resource.

In the following paragraphs other objects and achievements of the present invention will be apparent through the description of exemplary embodiments of the present invention and with reference to the drawing figures.

In all of above-referenced figures, the same reference numbers denote the same, similar or corresponding characters or functions.

In the following, some preferred embodiments of the present invention will be described in detail with reference to the accompanying drawing figures.

Exemplary embodiments of the present invention will be described in detail with respect to a method and an apparatus for controlling energy expended by sensor nodes in a wireless sensor network. It will be understood by those skilled in the art that the present invention can be applied in a variety of types of network, such as Bluetooth networks or Wireless Local Area Networks (WLAN) without departing from the scope of the present invention.

In a wireless sensor network, in order to ensure a successful data transmission, a node transmits data to a receiving node, and the receiving node will send back feedback information after it successfully receives the data, so as to acknowledge the successful data transmission. If the node that sends data does not receive any feedback information about successful data transmission in a retransmission timeout, the data will be re-sent. If the node that sends the data still does not receive any feedback information about successful data transmission after re-sending, the data will be re-sent many times, until the data is transmitted successfully. Alternatively, if it is still not successful after a certain number of times of re-sending, the data transmission will be ended.

Figure 1:
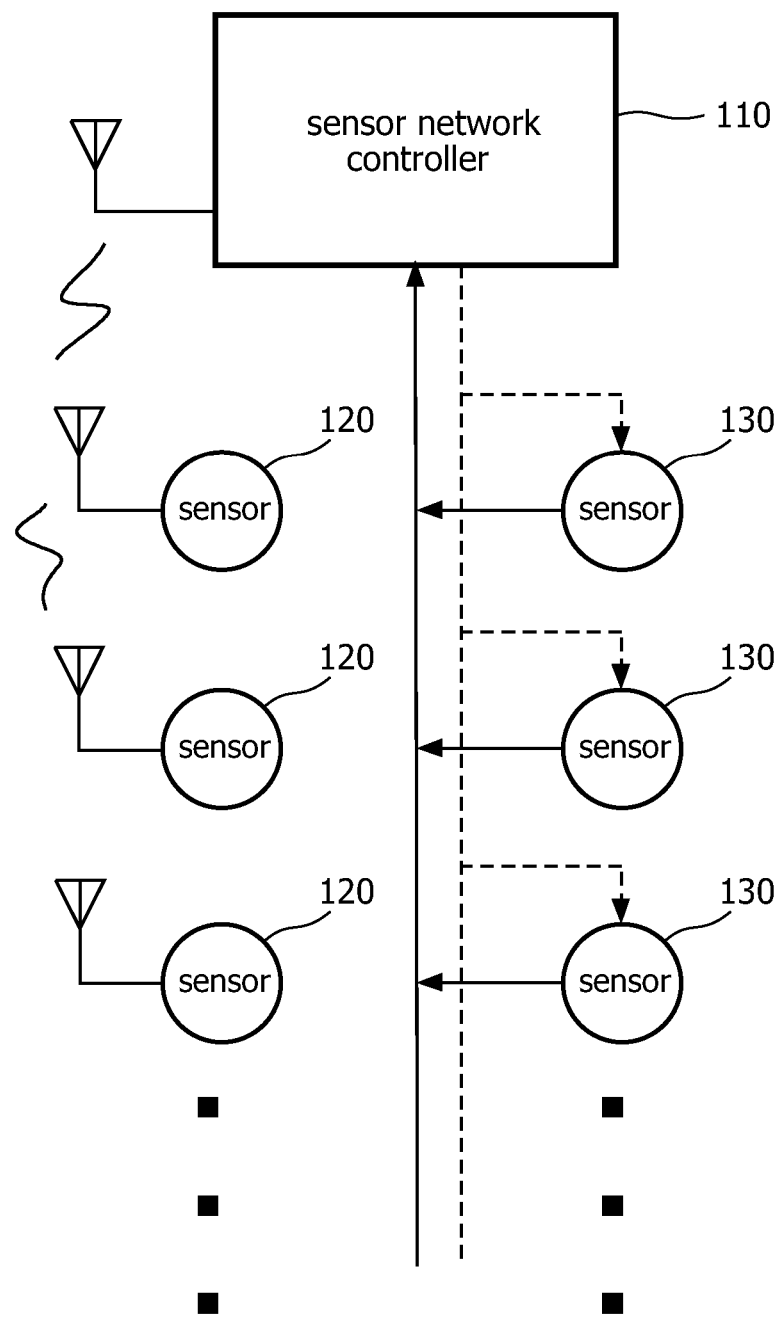
FIG. 1 is an illustrative view of a sensor network configuration in accordance with an embodiment of the present invention.

FIG. 1 is an illustrative view of a sensor network configuration in accordance with an embodiment of the present invention. This sensor network includes a sensor network controller 110, a plurality of wireless sensor nodes 120, and a plurality of wired sensor nodes 130.

The sensors 120 and 130 are connected to the sensor network controller 110 via wired or wireless connection. The sensor network controller 110 is used to collect data, the function thereof being similar to a base station in a wireless communication network or a router in a wired communication network, or a combination of them. The wired communication between each sensor 120 and 130 and the sensor network controller 110 is via Local Area Network (LAN) or via a dedicated communication line, and the wireless communication may adopt the Wireless Local Area Network (WLAN) or Bluetooth standard.

The respective sensor nodes 120, 130 transmit the information of detecting result and so on to the sensor network controller 110, for example, via the wired transmission shown in solid lines in the figures. At the same time, the sensor network controller 110 may also send control signals to the respective sensors 120, 130, for example, via the wired transmission shown in dashed lines in the figures; which will be optimized. The optimization process includes determining whether the information will be transmitted through a certain sensor, adjusting the sampling rate of a certain sensor, or determining whether the data of a certain sensor will be encrypted, and so on. It can be seen from FIG. 1 that the sensor network controller 110 is a convergent point of all the detected data. Controller 110 analyzes and processes the detected data, and acts as a process center of the detected results and also as a control center for optimizing the network.

Figure 2:
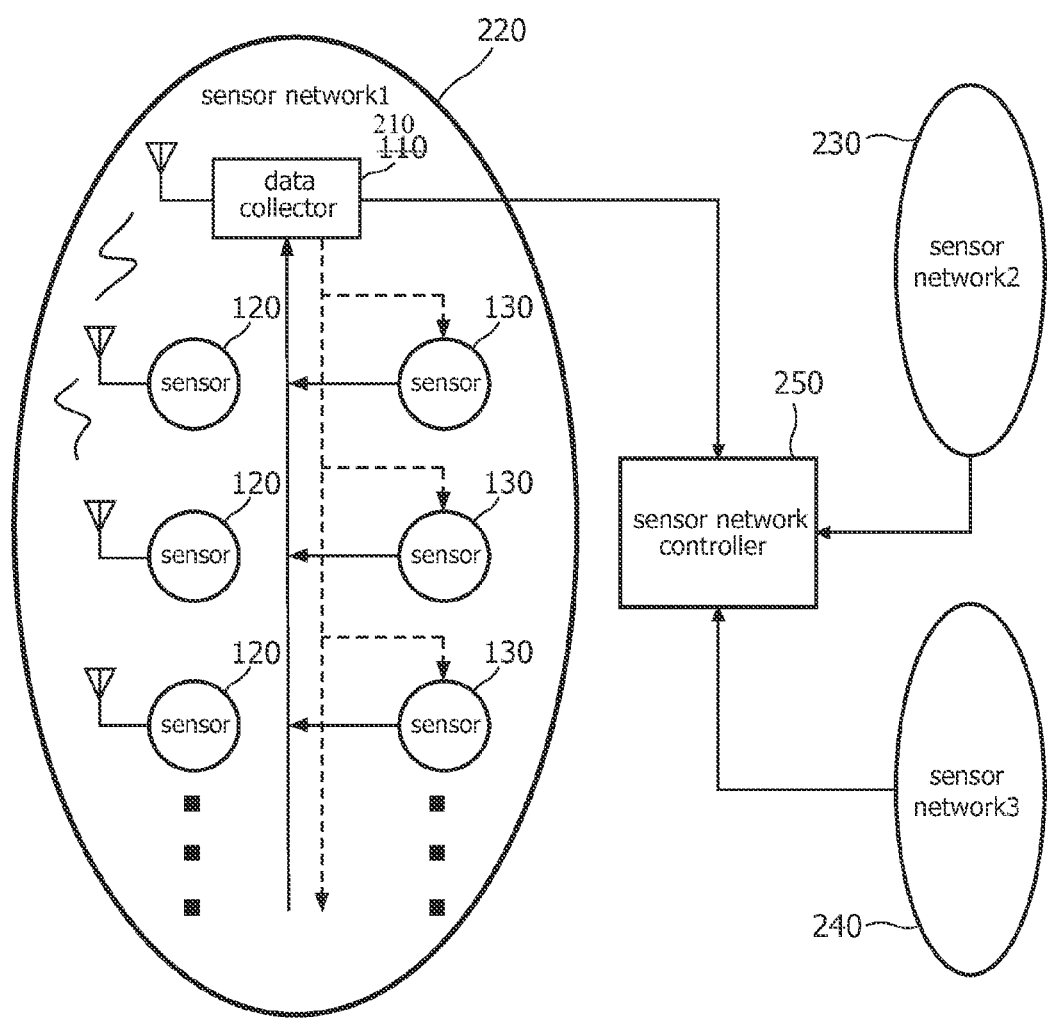
FIG. 2 is an illustrative view of a sensor network configuration in accordance with another embodiment of the present invention.

FIG. 2 is an illustrative view of a sensor network configuration in accordance with another embodiment of the present invention. In this embodiment, a plurality of sensors 120 and 130 are connected to a data collector 210 via wired or wireless connection, constituting a sensor network 220. Distinct sensor networks 220, 230 and 240 are connected with a sensor network controller 250 via their respective data collectors. The sensor network controller 250 collects sensor data from the respective sensor networks 220, 230 and 240, and sends control commands to the respective sensor networks 220, 230 and 240. As described above in connection with the FIG. 1 embodiment, various optimization processes are performed to the respective sensors 120 and 130 in the networks 220, 230 and 240 by their respective data collectors, such as by data collector 210 in sensor network 220.

Figure 3:
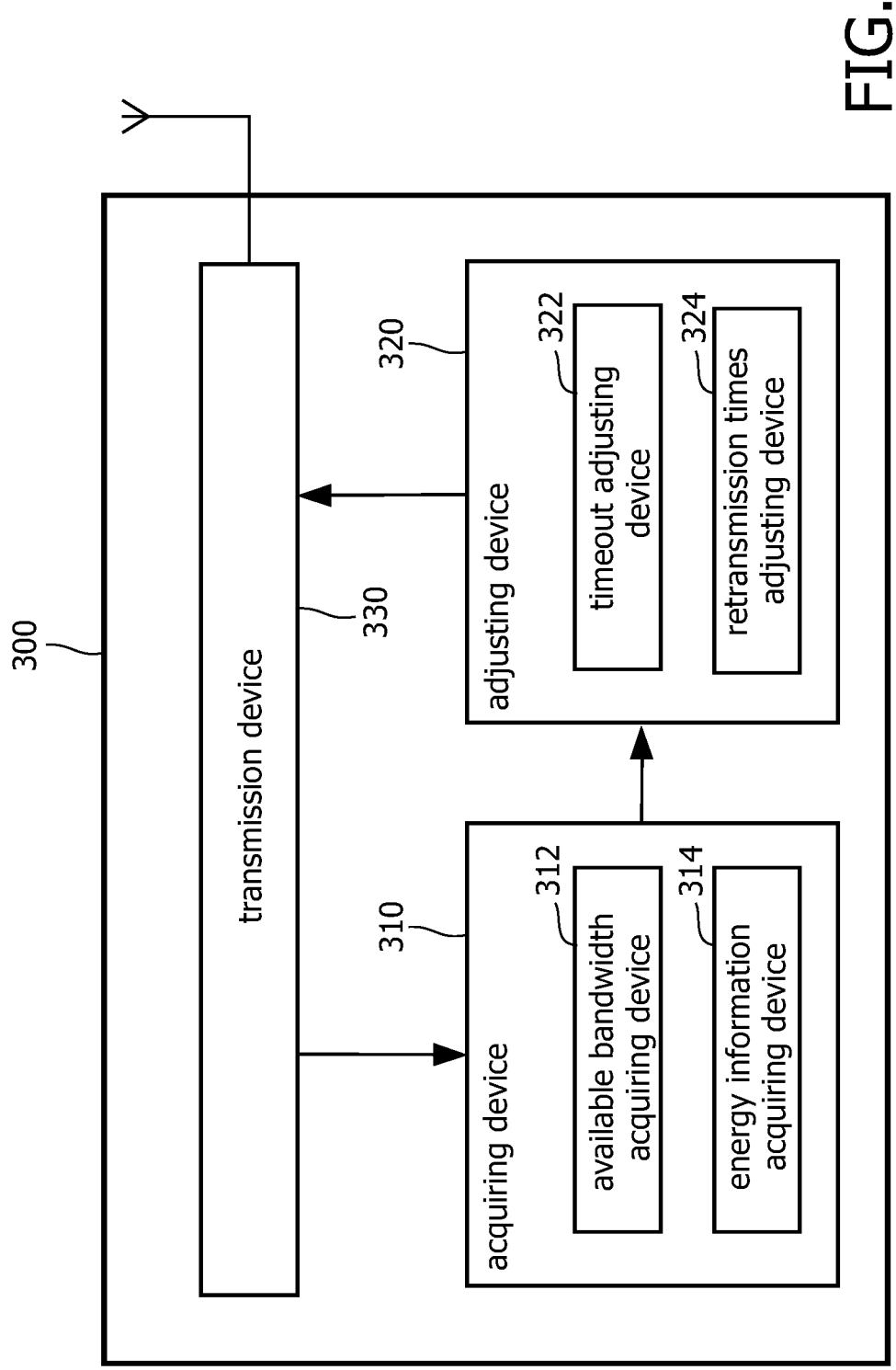
FIG. 3 is an illustrative view of a functional configuration of a network controller in a sensor network in accordance with an embodiment of the present invention.

FIG. 3 is an illustrative view of a functional configuration of a network controller in a sensor network in accordance with an embodiment of the present invention.

The sensor network controller 300 includes an acquiring device 310, an adjusting device 320 and a transmission device 330. The acquiring device 310 includes an energy information acquiring device 314, which is used to acquire energy information, the energy information being indicative of the energy status of one node in the network. For example, the energy information may be indicative of the power supply status of a sensor node. For instance, the power status of a node may be classified into three levels, i.e. high, middle, and low, which are expressed by the values of 3, 2, and 1 respectively.

The energy information is monitored by a power monitor device (not shown in the figures) on the nodes in the network, and then transferred to the energy information acquiring device 314.

The adjusting device 320 is used to adjust at least one data transmission parameter of the node according to the energy information. The data transmission parameter may be the retransmission timeout and/or retransmission times, the retransmission timeout being the timeout in which the node that sends data will resend the data if it does not receive any feedback information about successful data transmission: the retransmission times being a specific number of times which the node that sends data will resend the data if it does not receive any feedback information about successful data transmission.

In accordance with an embodiment of the present invention, the sensor network controller 300 may further include an available bandwidth acquiring device 312 for acquiring the status of an available bandwidth when a node is transmitting data. The status of the available bandwidth may be monitored by a network monitor device (not shown in the figures) and then transferred to the available bandwidth acquiring device 312.

The adjusting device 320 includes a timeout adjusting device 322, for adjusting the retransmission timeout of a sensor node based on the energy information acquired by the acquiring device. The more sufficient the power supply that the sensor node has, the shorter the timeout is before retransmitting the data to the objective sensor node adjusted to. Conversely, a longer timeout before retransmitting the data to the node adjusted to takes place for a less sufficient power supply. In this way, the power consumption of the sensor node is conserved.

The adjusting device 320 includes a retransmission times adjusting device 324 for adjusting the number of times of retransmitting data after the data transmission failed, based on the energy information acquired by the acquiring device. The more sufficient the power supply that the sensor node has, the more times the data is retransmitted to the objective sensor node adjusted to. Conversely, the less sufficient the power supply, the fewer the number of times that the data is retransmitted. In this way, the power consumption of the sensor node is conserved.

The sensor network controller 300 further includes the transmission device 330 for the sensor nodes to send and receive data and communicate with other sensor nodes in the sensor network. For example, the transmission device 330 may be a signal transmitter/receiver under the protocol of a Zigbee or a Bluetooth network.

In the present embodiment, acquiring the power of the network controller 300 can be achieved by bandwidth acquiring, and the functions of adjusting the retransmission timeout and adjusting the retransmission times can be performed by various nodes in a sensor network, as long as these various nodes can communicate with each other.

It should be understood that all or part of the functions of the sensor network controller 300 disclosed in FIG. 3, according to an embodiment of present invention, can also be achieved by an appropriately programmed computer, the computer being loaded with a computer program for controlling the energy expended by sensor network nodes. The computer program includes: code for acquiring energy information, said energy information being indicative of the energy status of a node in the network, and code for adjusting at least one data transmission parameter according to the energy information.

Such a computer program can be stored in a storage media.

Parts of the computer program code can be provided to a processor to generate a machine, so that the code executed on the processor creates a device that can achieve the above functions.

Figure 4:
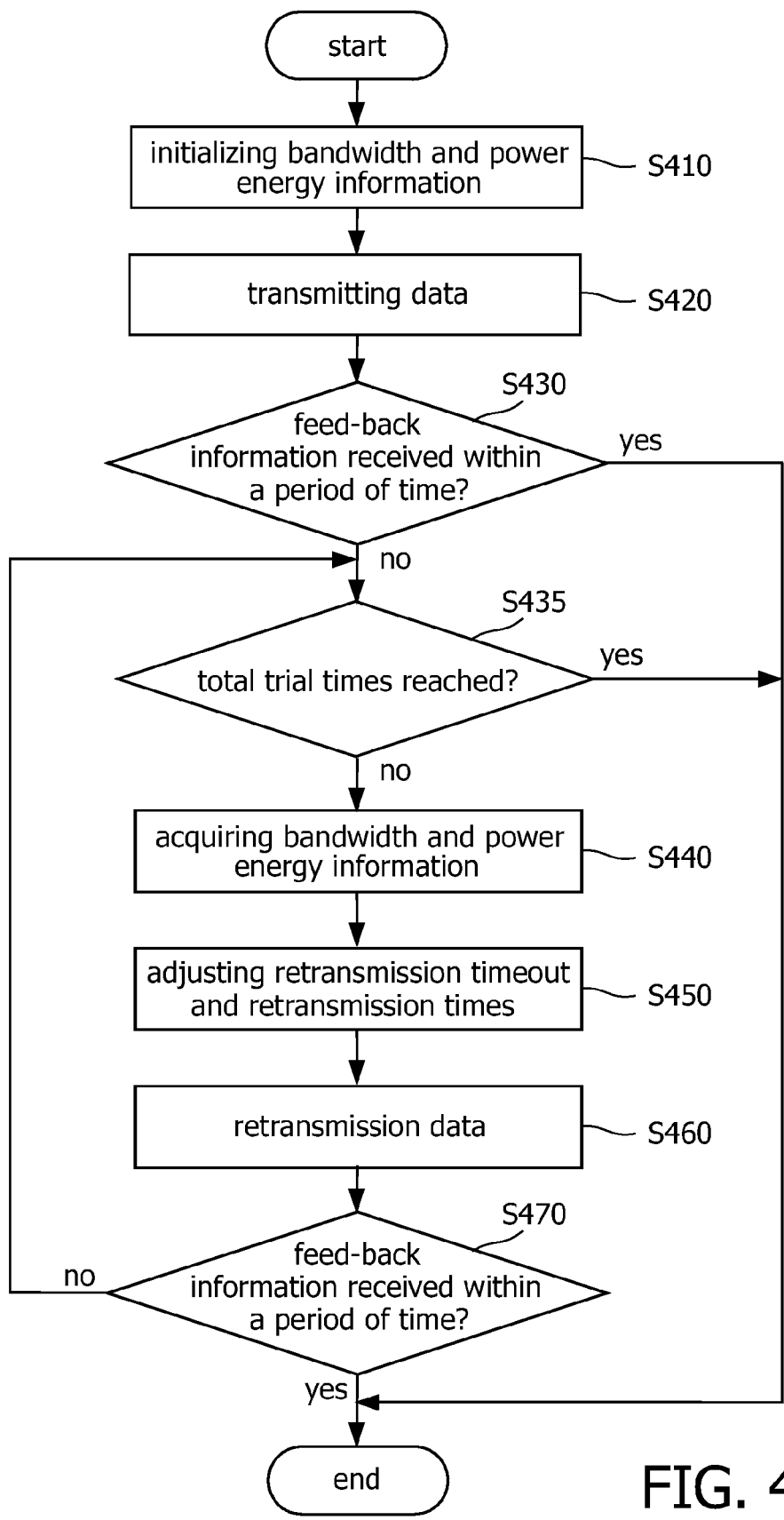
FIG. 4 is a flow chart illustrating a method of controlling energy expended by sensor network nodes in accordance with an embodiment of the present invention.

The flow chart of FIG. 4 illustrates a method of optimizing the wireless sensor network in accordance with an embodiment of the present invention.

At first, at step S410, the data transmission parameters of respective sensor nodes in the sensor network are initialized. During the initializing communication process a convergent node broadcasts connection signaling actively and, after a data frame and a MAC (Media Access Control) command frame are successfully received and verified at a sensor node, an acknowledge frame is returned to the convergent node. Next, the sensor node is brought into a sleep operation mode. Next, the convergent node and the sensor node are master-slave exchanged, and the convergent node module is brought into a mode operation status, and waiting for a response for connecting request signaling; and the sensor node is operated in the master mode, and waiting for wake-up when required or launches a connecting request in other ways.

After initialization, two initialized data transmission parameters can be obtained: a retransmission timeout and a retransmission times.

At step S420, the sensor node starts to transmit the data to another sensor node.

At step S430, it is determined whether an acknowledge information about a successful data transmission fed-back from another sensor node is received in an initialized retransmission timeout. If an acknowledge information is received in the retransmission timeout, the whole process will end immediately.

If an acknowledge information is not received by the sensor node in the initialized timeout, at step S435 it is determined whether the total number of trial times of data retransmission (i.e. the initialized retransmission times or adjusted retransmission times) has been reached. If the total trial times of data retransmission have been reached, the whole process will end immediately.

If it is determined that the total trial times of data retransmission have not been reached, at step S440 the sensor node acquires its current energy status information and may acquire current available bandwidth information in the sensor network.

At step S450, according to the acquired energy status information and/or current available bandwidth information, the retransmission timeout and retransmission times are adjusted accordingly.

The more sufficient the power supply that the sensor node has, the shorter the timeout is before retransmitting the data to the objective sensor node adjusted to. Conversely, a longer timeout before retransmitting the data to the node adjusted to takes place for a less sufficient power supply. In this way, the power consumption of the sensor node is conserved. The more sufficient the power supply that the sensor node has, the more times the data is retransmitted to the objective sensor node adjusted to. Conversely, the less sufficient the power supply, the fewer the number of times that the data is retransmitted. In this way, the power consumption of the sensor node is conserved.

Figure 5:
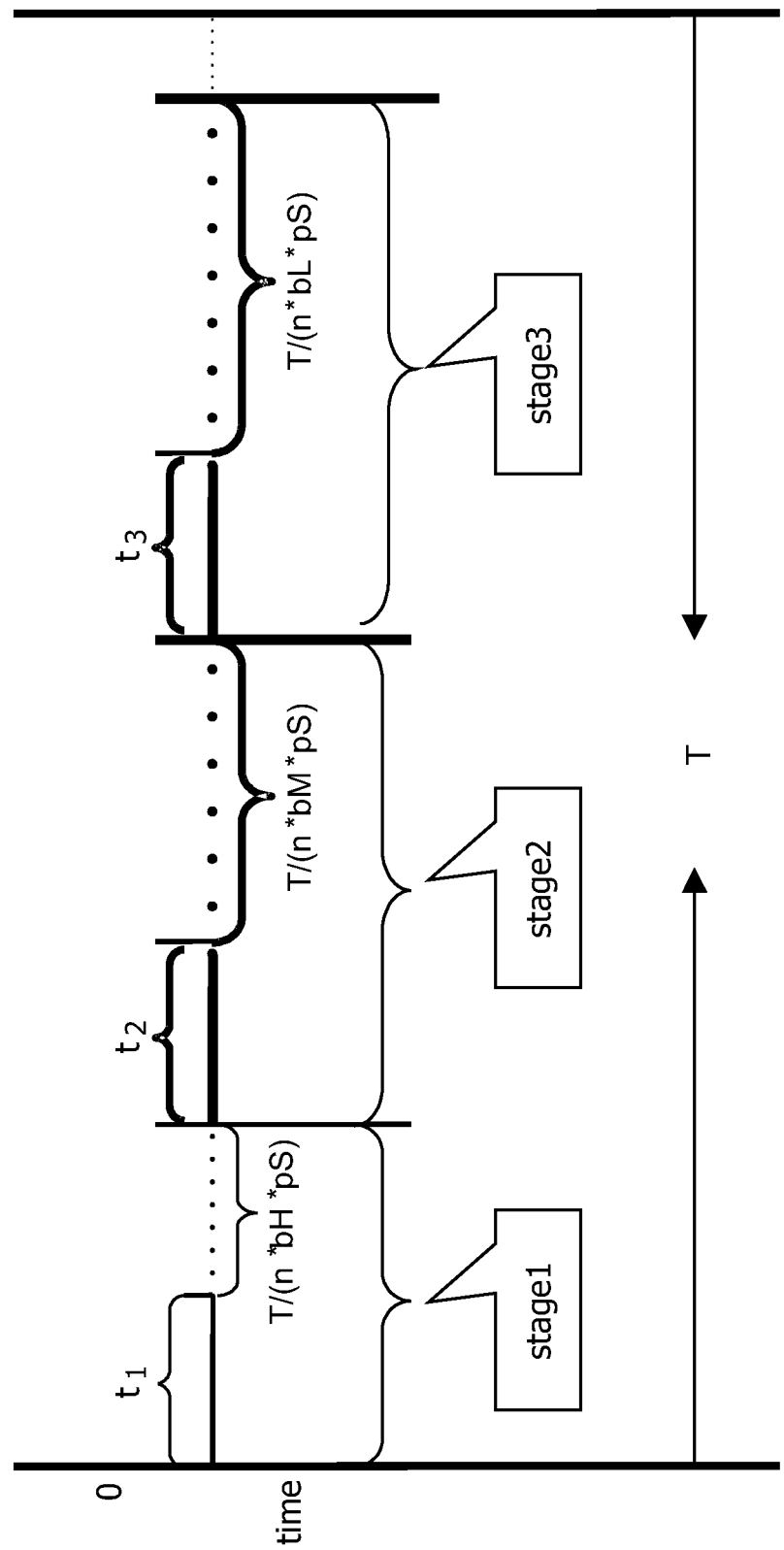
FIG. 5 is an illustrative view of a method of controlling energy expended by sensor network nodes in accordance with an embodiment of the present invention.

For the same reason, the more sufficient the available bandwidth that the sensor node has, the shorter the timeout is before retransmitting the data to the objective sensor node adjusted to. Conversely, a longer timeout is necessary when retransmitting the data at a lower bandwidth. The specific adjustment is shown in FIG. 5.

At step S460, according to the adjusted data transmission parameters, i.e. retransmission timeout and retransmission times, the data is retransmitted.

At step S470, it is determined whether an acknowledge information about a successful data transmission fed-back from another sensor node is received in the adjusted retransmission timeout. If an acknowledge information is received in the initialized timeout, the whole process will end immediately. Otherwise, jump to step S435, and then, if the total trial times has not yet been reached, to S440 where its current energy status information and current available bandwidth information in the sensor network are acquired. Then, according to the energy status information and current available bandwidth information, the retransmission timeout and retransmission times are adjusted in step S450 and the data is again retransmitted in step S460. This cycle is continually repeated until the data transmission is successful or the retransmission times have been reached. Then the transmission is ended.

It should be understood that the frequency of adjusting the data transmission data (step S450) might be adjusted according to the actual network status. For example, it could be adjusted once after three times of data transmission failure, or adjusted once in every certain period, such as 30 minutes.

FIG. 5 is an illustrative view of a method of controlling energy expended by sensor network nodes in accordance with an embodiment of the present invention.

As shown in the figure, wherein T is indicative of an interval between two data transmissions of a sensor node; t1, t2 and t3 are indicative of consecutive time periods in which the sensor node transmits a data; b is indicative of the network available bandwidth, and bH, bM and bL are indicative of a higher available bandwidth, a middle available bandwidth and a lower available bandwidth respectively; pS is indicative of the power supply status of the sensor node, for example, the power status of a node may be classified into three levels, i.e. high, middle, and low, which are expressed by the power information 1, 2, and 3 respectively.

Firstly, at stage 1, during the period t1, the sensor node transmits a data to an objective sensor node, and the current available bandwidth is bH, and the power supply status of the sensor node is p1. Then, if during the period $T/(n*bH*p1)$ the sensor node does not receive an acknowledge information about a successful data receipt from the objective sensor node, go to stage 2 and the data is retransmitted to the objective sensor node. Note that n is an adjust coefficient that, for example, may be set equal to 20~30 according to the actual power supply status of the sensor node.

Next, at stage 2, during the period t2, the sensor node retransmits the same data to the objective sensor node. At the same time, according to the updated information, it is known that the current available bandwidth is bM, and the power supply status of the sensor node is p2, and then the retransmission timeout is adjusted to $T/(n*bM*p2)$.

According to the adjusted timeout, if at the time $t1+t2+T/(n*bH*p1)+T/(n*bM*p2)$ the sensor node does not receive an acknowledge information about a successful data receipt from the objective sensor node, go to stage 3, and the data is retransmitted to the objective sensor node.

Next, at stage 3, during the period t3, the sensor node retransmits the same data to the objective sensor node again. At the same time, according to the updated information, it is known that the current available bandwidth is bL, and the power supply status of the sensor node is p3, and then the retransmission timeout is adjusted to $T/(n*bL*p3)$.

According to the adjusted timeout, if at the time $t1+t2+t3+T/(n*bH*p1)+T/(n*bM*p2)+T/(n*bL*p3)$ the sensor node does not receive an acknowledge information about a successful data receipt from the objective sensor node, the data is continued to be retransmitted to the objective sensor node until the data transmission is successful or the number of retransmission times has been reached, at which time the transmission is ended.

According to an embodiment of the present invention, the number of times which the data is retransmitted to the objective sensor node can be adjusted according to the power supply status of the sensor node. The more sufficient the power supply that the sensor node has, the more will be the total number of trial times for retransmitting the data to the objective sensor node be adjusted. Conversely, the less sufficient the power supply, the fewer the number of (total trial) times of retransmitting the data. In this way, the power consumption of the sensor node is conserved.

For example, the power status pS of a sensor node may be classified into three levels, i.e. high, middle, and low, which are expressed by the value 1, 2, and 3 respectively, and then the total trial times to retransmit the data R could be calculated from R=m/pS. Wherein m is a positive integer coefficient, for example, it can be set to m=8, and then if the power status of the sensor node pS=2, the times to retransmit the data R equals to 4 times.

It should be understood by those skilled in the art that, the method and apparatus disclosed in present invention can be modified without departing the content of present invention, Therefore, the protected scope of the present invention should be limited by the content of the appended claims.

The invention claimed is:

1. A method for conserving energy expended by a communications network including nodes having limited supplies of energy said method comprising the steps of:
   (a) acquiring energy information indicative of an energy status of one of said nodes; and
   (b) according to the energy information, conserving energy expended by said node by adjusting at least one of:
      (i) a timeout before a transmission device repeats a transmission of data to said node; and
      (ii) a limit on a number of times that the data will be retransmitted to said node, where said adjustment decreases the timeout in response to an increase of the energy supply to said node and increases the timeout in response to a decrease of said energy supply.

2. The method as claimed in claim 1, where said adjustment increases the limit on the number of times that data will be retransmitted to said node in response to an increase of the energy supply to said node and decreases said limit in response to a decrease of said energy supply.

3. The method as claimed in claim 1, further including a step of acquiring bandwidth information indicative of an available bandwidth status of the node, said bandwidth information being utilized as a basis for adjusting said timeout.

4. An apparatus for conserving energy expended by a network including nodes having limited supplies of energy, said apparatus comprising:
   an acquiring device for acquiring energy information indicative of an energy status of one of said nodes; and
   an adjusting device for, according to the energy information, conserving energy expended by said node by adjusting at least one of:
      a timeout before repeating a transmission of data to said node; and
      a limit on a number of times that the data will be retransmitted to said node, further including a bandwidth information acquiring device for acquiring bandwidth information indicative of an available bandwidth status of the node, said adjusting device utilizing the bandwidth information as a basis for adjusting said timeout.

5. The apparatus as claimed in claim 4, where said adjusting device decreases the timeout in response to an increase of the energy supply to said node and increases the timeout in response to a decrease of said energy supply.

6. The apparatus as claimed in claim 4, where said adjusting device increases the limit on the number of times that data will be retransmitted to said node in response to an increase of the energy supply to said node and decreases said limit in response to a decrease of said energy supply.

7. A computer program embodied in a non-transitory computer-readable medium for effecting the performance of a method for conserving energy expended by a network including nodes having limited supplies of energy, said method comprising:
   acquiring energy information indicative of an energy status of one of said nodes; and
   according to the energy information, conserving energy expended by said node by adjusting at least one of:
      a timeout before repeating a transmission of data to said node; and
      a limit on a number of times that the data will be retransmitted to said node, further including a bandwidth information acquiring device for acquiring bandwidth information indicative of an available bandwidth status of the node, said adjusting device utilizing the bandwidth information as a basis for adjusting said timeout.

8. A network, comprising:
   a plurality of nodes; and
   a network controller connected with said plurality nodes;
   said network controller comprising:
      an acquiring device for acquiring energy information indicative of an energy status of one of said nodes; and
      an adjusting device for, according to the energy information, conserving energy expended by said node by adjusting at least one of:
         a timeout before repeating a transmission of data to said node; and
         a limit on a number of times that the data will be retransmitted to said node, where said adjustment decreases the timeout in response to an increase of the energy supply to said node and increases the timeout in response to a decrease of said energy supply.

9. A method for conserving energy expended in communicating with wireless nodes in a network, said method comprising:
   (a) acquiring energy information indicative of the current supply of energy available to one of said nodes;
   (b) acquiring bandwidth information indicative of the current bandwidth available for communicating with said node; and
   (c) according to the energy information and the bandwidth information, conserving the energy expended by said node by adjusting at least one of:
      (i) a timeout before a transmission device repeats a transmission of data to said node; and
      (ii) a limit on a number of times that the data will be retransmitted to said node, where both of said energy supply and said bandwidth are utilized as factors in determining the timeout.

10. The method as claimed in claim 9 where an increase in said energy supply is a factor tending to decrease the timeout and a decrease in said energy supply is a factor tending to increase the timeout.

11. The method as claimed in claim 9 where an increase in said bandwidth is a factor tending to decrease the timeout and a decrease in said bandwidth is a factor tending to increase the timeout.

12. The method as claimed in claim 9 where said energy supply is utilized as a factor in determining the limit on the number of times that the data will be retransmitted to said node, an increase in said energy supply being a factor tending to increase said limit and a decrease in said energy supply being a factor tending to decrease said limit.

* * * * *